United States Patent [19]

Ogaki et al.

[11] Patent Number: 4,674,055

[45] Date of Patent: Jun. 16, 1987

[54] SOFTWARE VENDING SYSTEM

[75] Inventors: Hirokazu Ogaki; Yasuhiro Funahashi; Hiroshi Koie; Tomoko Kurachi, all of Nagoya, Japan

[73] Assignee: Brother Kogyo Kabushiki Kaisha, Aichi, Japan

[21] Appl. No.: 614,664

[22] Filed: May 29, 1984

[30] Foreign Application Priority Data

| | | | |
|---|---|---|---|
| Jun. 9, 1983 | [JP] | Japan | 58-103232 |
| Jun. 9, 1983 | [JP] | Japan | 58-103233 |
| Jun. 10, 1983 | [JP] | Japan | 58-104742 |

[51] Int. Cl.[4] ........................ G06F 15/21; G06F 15/44

[52] U.S. Cl. .................................... 364/479; 364/410; 364/900

[58] Field of Search ............... 364/478, 479, 401, 404, 364/405, 406, 410, 200 MS File, 900 MS File; 369/84, 85; 360/15; 235/379, 380, 381

[56] References Cited

U.S. PATENT DOCUMENTS

| | | | |
|---|---|---|---|
| 3,718,906 | 2/1973 | Lightner | 360/15 X |
| 3,990,710 | 11/1976 | Hughes | 360/15 X |
| 4,141,045 | 2/1979 | Sheehan | 360/92 X |
| 4,227,220 | 10/1980 | Brown | 360/15 X |
| 4,240,120 | 12/1980 | Padwa | 360/15 |
| 4,414,467 | 11/1983 | Gould | 235/379 X |
| 4,593,376 | 6/1986 | Volk | 364/900 |
| 4,597,058 | 6/1986 | Izumi et al. | 364/900 |

FOREIGN PATENT DOCUMENTS

| | | | |
|---|---|---|---|
| 0096465 | 12/1983 | European Pat. Off. | 360/15 |
| 2013865 | 2/1983 | United Kingdom | 360/15 |

*Primary Examiner*—Joseph Ruggiero

*Attorney, Agent, or Firm*—Browdy and Neimark

[57] ABSTRACT

A software vending system comprising a host system including primary memory means for storing a plurality of different software programs, and a plurality of peripheral vending instruments each operatively connected to the host system for interactive data communication therebetween. Each of the peripheral vending instruments includes a selector device for selecting a desired one of the software programs, and a recording device operable to duplicate in a recording medium the selected software program transferred from the primary memory means in response to the operation of the selector device.

23 Claims, 9 Drawing Figures

SOFTWARE VENDING SYSTEM

BACKGROUND OF THE INVENTION

The present invention relates to a software vending system.

Nowadays, a variety of software programs for video games, and visual or audiovisual software programs for business and educational purposes are marketed and sold in a large scale, keeping pace with the wide spread use or popularization of microcomputers or personal computers. Such software programs are available on the market in the form of tape cassettes or floppy disks in which original or source programs are duplicated or copied by software manufacturers or suppliers. These tape cassettes and floppy disks having various duplicate programs are distributed by the manufacturers, suppliers or their distributors to local dealers who place orders for specific programs they want to sell.

However, the software manufacturers, suppliers or distributors encounter difficulty in having a predictable prospect of demands of the individual software packages. Accordingly, they suffer a trouble in maintaining optimum stock of the individual packages to attend varying orders of the local dealers. Similarly, the local dealers have difficulty in keeping optimum stock of the software packages to meet the demands of the purchasers.

SUMMARY OF THE INVENTION

The present invention was developed to minimize the above indicated inconveniences experienced in the art. Accordingly, it is an object of the invention to provide a software vending system which is capable of vending various software programs at local dealers in quick response to their orders, without software manufacturers or distributors delivering program-loaded recording media such as tape cassettes or floppy disks to the local dealers, and with a minimum inventory control of such software programs by the manufacturers or distributors.

It is another object of this invention to provide such a vending system which permits a minimum inventory control of the software programs by the local dealers.

A further object of the invention is to provide such a vending system which does not require the display of program-loaded recording media at the local dealers.

Another object of the invention is the provision of such a vending system which permits the purchaser to recognize the contents of a program before the program is bought by the purchaser.

A still further object of the invention is the provision of such a vending system which enables the purchaser to verify a desired program bought by the purchaser, against its source program, thereby avoiding an unnecessary conflict between the purchaser and the local dealer.

According to the present invention, there is provided a software vending system comprising a host system including primary memory means for storing a plurality of different software programs, and further comprising a plurality of peripheral vending instruments each operatively connected to the host system for interactive data communication therebetween. Each of the plural peripheral vending instruments includes selector means for selecting a desired one of the software programs, and recording means operable to duplicate in a recording medium the selected software program which has been transferred from the primary memory means in response to the operation of the selector means.

In the software vending system arranged as described above, a desired one of plural software programs stored in the primary memory means in the host system may be selected by the selector means on the peripheral vending instrument, and the selected program is transferred to the peripheral vending instrument to be duplicated in a suitable recording medium. With this arrangement, the software manufacturer, supplier or distributor at which the host system is installed, can sell software programs to consumers or purchasers through local dealers at which the peripheral vending instruments are installed, without delivering program-loaded recording media such as tape cassettes or floppy disks to the local dealers, and without the local dealers having to display such program-loaded recording media. Thus, the software vending system according to the present invention requires a minimum inventory control of the software goods by the manufacturer, supplier, distributor and by the local dealers owning or managing the peripheral vending instruments.

According to one advantageous form of the software vending system of the invention, each of the peripheral vending instruments includes secondary memory means for storing the selected program transferred from the primary memory means, before the selected program is duplicated in the recording medium. That is, a program is transferred from the primary memory means to the secondary memory means when the program is selected by the selector means. The vending instrument further comprises means for checking if a condition required for vending the selected program is satisfied or not, the checking means being placed in its predetermined position when the required vending condition is satisfied, and further comprises central processing means for inhibiting the recording means from duplicating the selected program until the checking means has been placed in the said predetermined position.

In the above arrangement, the selected program is duplicated only after the required condition for vending that program has been established. Preferably, the checking means comprises a counter which generates a signal representative of a sum of money deposited into the vending instrument. in this instance, the selected program transferred to the secondary memory means is duplicated only after the counter senses that a large enough amount of money has been deposited into the instrument.

According to another advantageous form of the software vending system of the invention, each of the peripheral vending instruments has visual display device, and secondary memory means for storing demonstration data corresponding to the selected program. The demonstration data represents an abstract of the contents of the selected program stored in the primary memory means. The vending instrument further includes central processing means which retrieves from the secondary memory means the demonstration data and operates the visual display device to execute the retrieved demonstration data before the selected program is duplicated in the recording medium.

In the above arrangement, an abstract of the contents of the selected program is demonstrated on the visual display device, whereby the purchaser may have a brief idea of the subject matter of the selected program, and conequently the purchaser may easily decide whether to buy the program or not.

In accordance with a further advantageous form of the invention, each of the peripheral vending instruments further includes verifying means for verifying a duplicate program recorded in the recording medium, against the selected program transferred from the primary memory means, and further includes central processing means for inhibiting the recording means from duplicating the selected program when the verification by the verifying means reveals no duplication error, and for permitting the recording means to re-duplicate the selected program in the recording medium when the verification reveals any duplication error. Preferably, the vending instrument further includes a recording/playback device operable to read the duplicate program so as to verify the duplicate program by the verifying means. The recording/playback device is also operable to re-duplicate the selected program when the verification reveals any duplication error, thereby serving as part of the recording means.

In the above preferred form of the invention, the purchaser may verify the duplicate program in the recording medium, and if the duplicate program is not in conformity with the selected program stored in the secondary memory means, the purchaser may set the recording medium in the recording/playback device and re-duplicate the selected program in the recording medium. Thus, in the event of possible trouble of faulty duplication of a program, the purchaser may obtain a true copy of the program by using these verifying and re-duplication capabilities.

BRIEF DESCRIPTION OF THE DRAWING

The above and other objects, features and advantages of the present invention will become more apparent from reading the following description of the preferred embodiment taken in connection with the accompanying drawing in which.

DETAILED DESCRIPTION OF THE PREFERRED EMBODIMENT

Figure 1:
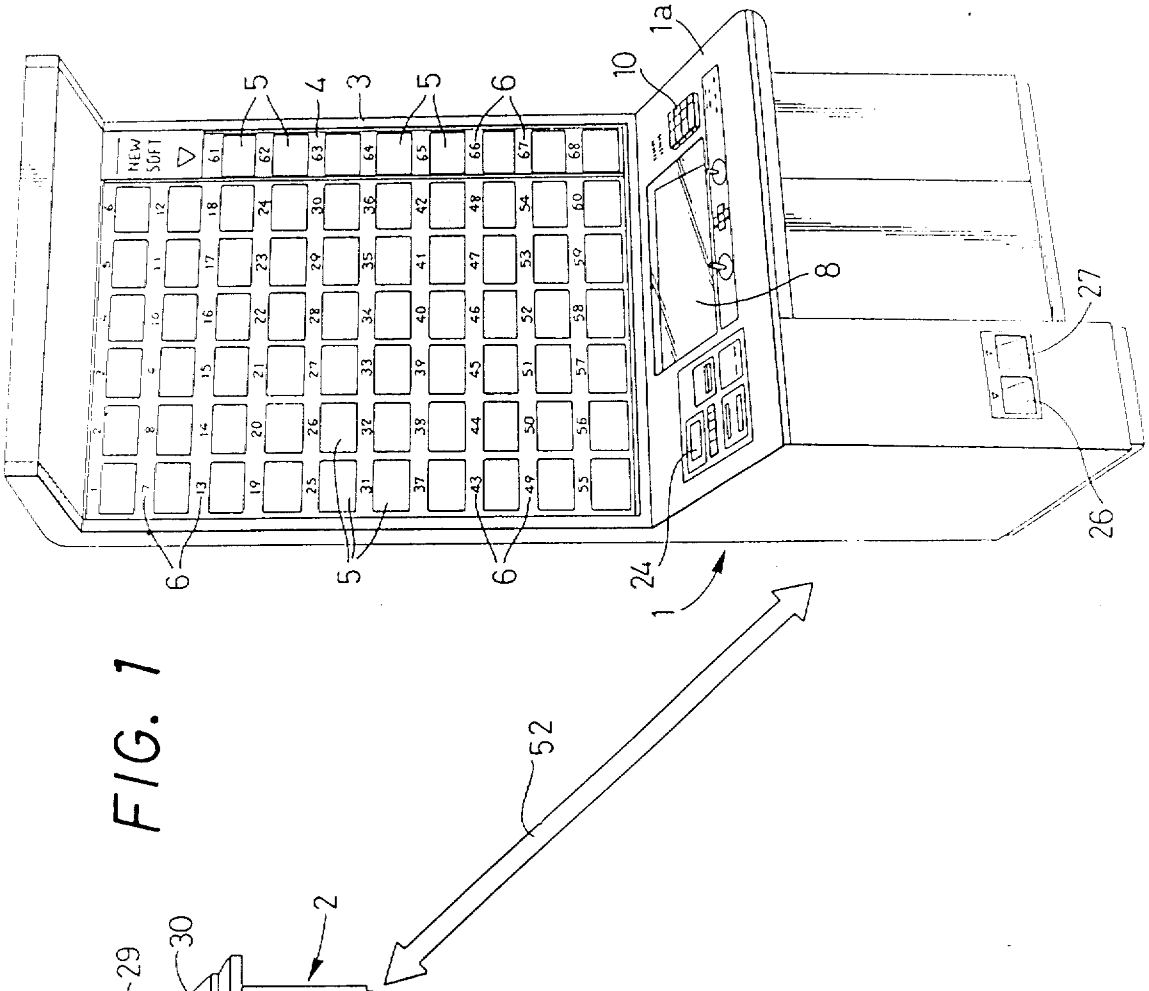
FIG. 1 is a perspective view of one embodiment of a software vending system of this invention.
Figure 1:
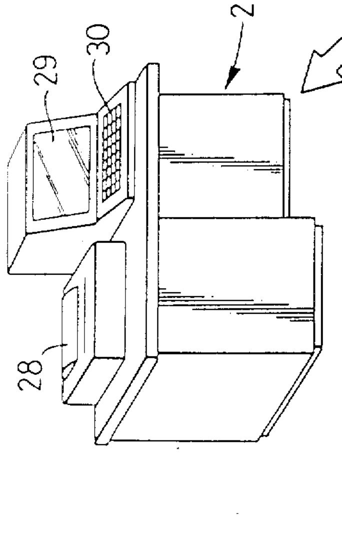

Referring first to FIG. 1, there is shown a preferred form of a software vending system which comprises a plurality of peripheral vending instruments 1 installed at local software dealers, and a host system 2 located at a software manufacturer, supplier or distributor. Each vending instrument 1 is are operatively connected via a private communication line 52 to the host system 2, to permit on-line interactive data communication as therebetween, as indicated in FIG. 1. Each of the peripheral vending instruments 1 comprises a control table 1*a* on which are provided various control keys and switches, and other device used to operate the vending instrument 1 as described later in detail. At the rear of this control table 1*a*, there is provided a display or exhibition device 3 which stands upright.

The exhibition device 3 comprises a display panel 4 carrying 68 representations 5 which are disposed in plural rows. Each representation 5 consists of a title of a software program and an animated cartoon or pictorial or illustrative image showing the contents or subject matter of the program. The individual programs indicated by the respective representations 5 are numbered by Serial-No. indicia 6 disposed right above the corresponding representations 5. In this specific embodiment, Serial Nos. 1–20, 21–40, 41–60, and 61–68 respectively designate: software programs for video games (hereinafter referred to as GAME programs); software programs for business purposes (hereinafter referred to as BUSINESS programs); software programs for educational purposes (hereinafter referred to as EDUCATIONAL programs); and such GAME, BUSINESS and/or EDUCATIONAL programs which are newly marketed products. Thus, these software programs identified by the representations 5 and designated by the Serial-No. indicia 6 are classified into three groups, i.e., GAME, BUSINESS and EDUCATIONAL, each group consisting of programs having utilities in the same category. The new software programs, Serial Nos. 61–68 include the GAME, BUSINESS and EDUCATIONAL programs arranged at random.

The exhibition device 3 includes indicator lights 7 (FIG. 4) provided on the inner side of the display panel 4, so as to be located right behind the respective Serial-No. indicia 6. These lights 7 are illuminated under the control of central processing means which will be described.

Figure 2:
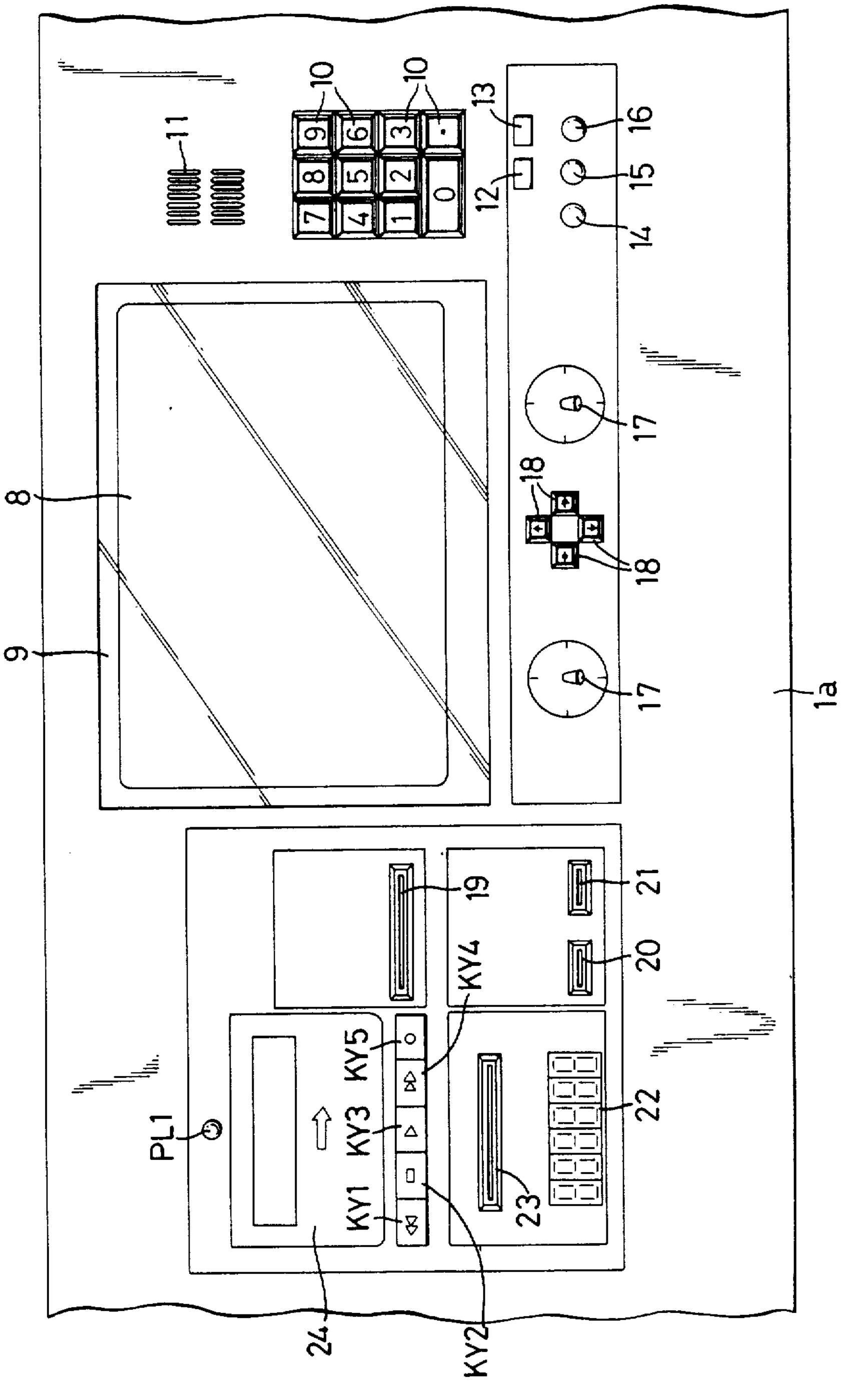
FIG. 2 is a fragmentary plan view of a control table of a peripheral vending instrument of the vending system of FIG. 1.

As illustrated in FIG. 2, the control table 1*a* has a visual display device in the form of a cathode ray tube 8 (hereinafter called CRT 8) having a screen which is covered by a transparent glass plate 9. This CRT 8 provides messages to a purchaser, displays the contents of each program on sale, and serves other functions, as discussed later in detail. The control table 1*a* further has numeric Ten-keys 10 disposed to the right of the CRT 8 to select a desired one of the 68 software programs through their serial numbers given by the Serial-No. indicia 6. At the back of the numberic Ten-keys 10 is provided a speaker 11 which is adapted to generate sounds for video games, alarm sounds, etc.

In front of the Ten-keys 10, there are disposed a START key 12 to execute the selection of a program which has been designated by the Ten-keys 10, and a RESET key 13 which is used to cancel the selection of a program once effected by depression of the START key 12. Three selector switches are provided in front of the START and RESET keys 12, 13: a GAME selector key 14; a BUSINESS selector key 15; and an EDUCATIONAL selector key 16. These selector keys 14, 15 and 16 are used to designate one of the three groups of software programs: GAME, BUSINESS: and EDUCATIONAL. Thus, the numeric Ten-keys 10, and the selector keys 14–16 serve as selector means for selecting a desired software program.

In front of the CRT 8, there are disposed manually-operated means: a pair of joy stick switches 17, and four joy keys 18 located between the switches 17. These switches and keys 17, 18 are used to interact with a selected program when it is executed on the CRT 8, or influence the execution of the program, in particular, to participate in a game which is animated by the selected program executed on the CRT 8. In other words, the manipulation of the switches 17 and keys 18 will affect visual images provided on the CRT 8 during execution of the program.

To the left of the CRT 8, there are provided cash-depositing means: a paper-money inlet 19 through which a 1000-yen bill is inserted into the instrument 1; a 100-yen coin slot 20 through which a 100-yen coin is deposited; and a 10-yen coin slot 21 for depositing a 10-yen coin. An indicator 22 disposed to the left of the 100-yen coin slot 20 indicates the sum of money deposited through the paper-money inlet 19 and the 100-yen and 10-yen coin slots 20, 21. The indicator 22 further indicates the serial number of a program designated by the Ten-keys 10, and other information. At the back of the indicator 22 is disposed a receipt exit 23 through which is fed out a receipt which is printed by a printer which will be described.

Figure 3:
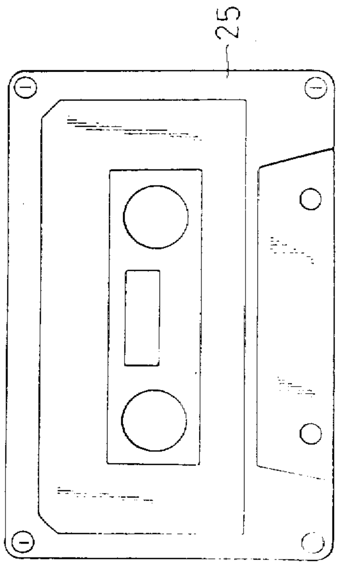
FIG. 3 is a front elevational view of a tape cassette used for the vending instrument.

The control table 1*a* is further provided, at the back of the receipt exit 23, with a tape cassette recording/-playback device 24 which is used, as one of recording means, by the purchaser to inspect or verify a program bought by the purchaser. The recording/playback device 24 is operated through manipulation of a REWIND key KY1, a STOP key KY2, a PLAY key KY3, a FAST FORWARD key KY4 and a RECORDING key KY5, which are all disposed on the front side of the device 24. An indicator, "COPY" light PL1 is disposed on the rear side of the recording/playback device 24. This "COPY" light PL1 is illuminated while a selected program is duplicated into a recording medium in the form of a tape cassette 25 of FIG. 3. The blank or non-recorded tape cassette 25 is stored in the vending instrument 1 in large quantities.

On the front left-hand side of the vending instrument 1, there are disposed a cassette tray 26 and a change tray 27. The cassette tray 26 receives the recorded tape cassette 25, and the change tray 27 receives change when the amount of money deposited through the inlet 19 and the coin slots 20, 21 exceeds a selling price of a program duplicated into the tape cassette 25.

The host system 2 includes a printer 28, a CRT 29, and a keyboard 30. The printer 28 is used to produce a printout of sales record of each software program sold by each local dealer, including dates of sales of the programs. The CRT 29 is used to display such sales records.

Figure 4:
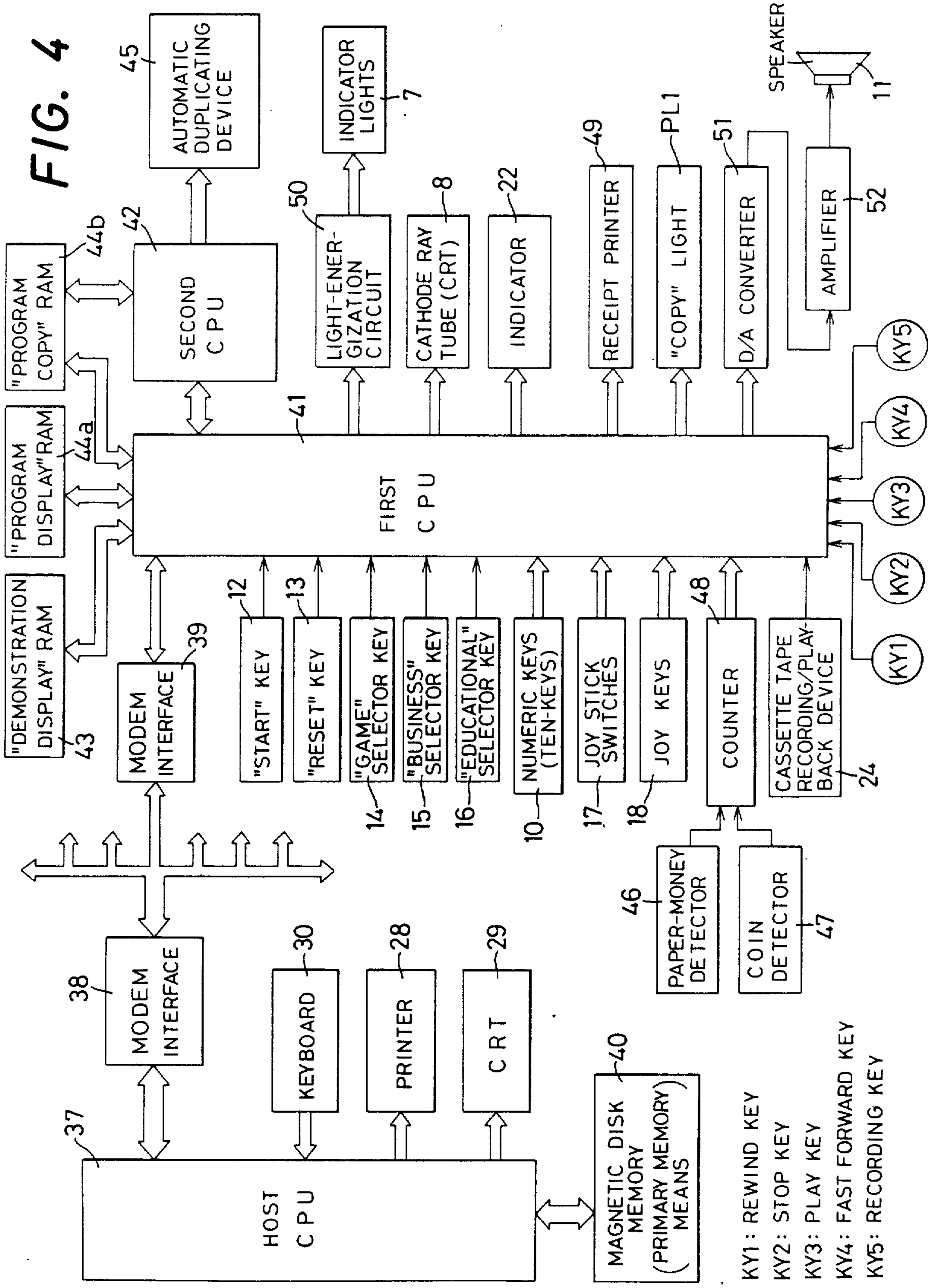
FIG. 4 is a schematic block diagram of a control arrangement of the vending system.

Referring next to FIG. 4, a control arrangement of the software vending system of the invention will be described below.

In the figure, the host system 2 comprises a central processing unit 37 (hereinafter referred to as host CPU 37) which is connected to a first central processing unit 41 hereinafter referred to first CPU 41) of each peripheral vending instrument 1 at the local dealer, through a MODEM interface 38, a MODEM interface 39 provided for the instrument 1 and a private or exclusive data communication line connecting the two MODEM interfaces 38 and 39, whereby interactive data communication between the host system 2 and the instrument 1 can be effected. The host system 2 further comprises primary memory means in the form of a magnetic disk memory 40 which has: a first memory area for storing source programs corresponding to the 68 programs which are exhibited on the display panel 4; a second memory area for storing price data indicative of selling prices of the programs; and a third memory area for storing sales data representing the sales records of the individual programs sold by each peripheral vending instrument 1, including the date of sale (year, month and day). The loading of source programs and the their price data into the respective first and second memory areas of the disk memory 40 is effected by personnel of the software manufacturer, supplier or distributor. The third memory area for the sales records has divided memory locations for the individual vending instruments 1, and each of these memory locations is divided into sections for different dates of sale of each one of the 68 programs on sale. Thus, the number (and amount) of sale of each program by each instrument 1 is recorded in the third memory area of the magnetic disk memory 40.

The peripheral vending instrument 1 comprises central processing means which consists of the previously introduced first CPU 41 and a second central processing unit 42 (hereinafter called second CPU 42). The first and second CPUs 41, 42, which serve various control functions including verification of a sold program, are adapted to exchange data to each other and operate according to a predetermined main program. The first CPU 41 receives data or signals from the host CPU 37 and the input devices such as the keys and switches previously described, and further receives command signals from the second CPU 42, which in turn receives command signals from the first CPU 41.

The first CPU 41 is connected to three secondary memory means in the form of random-access memories 43, 44*a*, and 44*b*. These first, second and third secondary memory means 43, 44*a* and 44*b* are hereinafter referred to as "DEMONSTRATION DISPLAY" RAM 43, "PROGRAM DISPLAY" RAM 44*a* and "COPY" RAM 44*b*.

The "DEMONSTRATION DISPLAY" RAM 43 stores: plural sets of demonstration data corresponding to the 68 software programs exhibited on the display panel 4; message data representing messages to the purchaser; and price data indicative of the selling prices of the programs. The demonstration data represents an abstract of the contents of the respective software program. These demonstration, message and price data are transferred to the CRT 8 to provide a demonstration display of a selected program, and to display selling messsages and prices.

The "PROGRAM DISPLAY" RAM 44*a* is to operate the CRT 8. When a software program is designated through the selector switches 14–16 and the Ten-keys 10, the designated program data is transferred from the magnetic disk memory 40 to the "PROGRAM DISPLAY" RAM 44*a* through the host CPU 37 and the first CPU 41. The first CPU 41 retrieves the program data from the "PROGRAM DISPLAY" RAM 44*a* and transfers it to the CRT 8 so that the selected program is executed on the CRT 8, that is, the first CPU 41 causes the CRT 8 to display the contents of the program, for example, enables a corresponding video game to be played on the screen of the CRT 8 if the selected program is a video game program.

The "COPY" RAM 44*b* stores, like the "PROGRAM DISPLAY" RAM 44*a*, a software program transferred from the magnetic disk memory 40. Further, when the program is transferred from the disk memory 40 to the "COPY" RAM 44*b*, the demonstration data stored in the "DEMONSTRATION DISPLAY" RAM 43 is transferred to the "COPY" RAM 44*b*. The selected program data and its demonstration data stored in the "COPY" RAM 44*b* are retrieved by the second CPU 42, which operates another recording means in the form of an automatic recording device 45 incorporated in the instrument 1, so that the selected program is copied or duplicated in the blank tape cassette 25. More specifically stated, the duplicating device 45 records a duplicate program (together with its demonstration data) in one of the blank tape cassettes 25 stored in the instrument 1, based on signals from the second CPU 42. After completion of the program loading into the tape cassette 25, the tape is rewound and the cassette 25 is ejected to the cassette tray 26.

A paper-money detector 46 and a coin detector 48 are provided to detect bills (paper-money) and coins deposited through the paper-money inlet 19 and the coin slots 20, 21. Signals from these detectors 47, 48 are applied to a counter 48 which counts the sum of the deposited money, and feeds "deposit" data to the first CPU 41.

Depending upon the "deposit" data from the counter 48 in comparison with the appropriate price data, the first CPU 41 directs the second CPU 42 to retrieve the selected program and its demonstration data stored in the "COPY" RAM 44*b* and to operate the automatic recording device 45 to duplicate the retrieved program and the demonstration data into the tape cassette 25, as described later in detail. Further, the first CPU 41 causes the indicator 22 to display the sum of the deposited money based on the "deposit" data, and controls a receipt printer 49 built in the instrument 1 to print out a receipt.

The first CPU 41 controls a light energization circuit 50 which energizes a group of the 68 indicator lights 7 corresponding to the group of programs selected by the GAME, BUSINESS and EDUCATIONAL selector switches 14–16, and effects a flickering or blinking operation of a particular one of the indicator lights 7 corresponding to a specific program selected by the Ten-keys 10. A D/A (digital/analog) converter 51 is connected to the first CPU 41 to covert a digital control signal of the first CPU 41 into an analog signal which is amplified by an amplifier 52 and transferred to the speaker 11, so that the speaker 11 generates video game sounds and alarm sounds.

Referring to flow charts of FIGS. 5–9 illustrating the sequence of control by the first and second CPUs 41, 42, there will be described the operation of the vending instrument 1 which is constructed as discussed hitherto. For easier understanding, steps of operations are numbered in the flow charts, and the step numbers (preceded by letter S) are referred to in the following description.

Upon turning on a power switch (not shown) on the instrument 1 (S1), the first CPU 41 is placed into its operative state wherein on-line interactive data communication with the host CPU 37 is possible through the private communication line. In this state, the first CPU 41 is ready to accept an input by a purchaser through operation of the GAME, BUSINESS and EDUCATIONAL selector switches 14, 15 and 16 (S1–S3).

Figure 5:
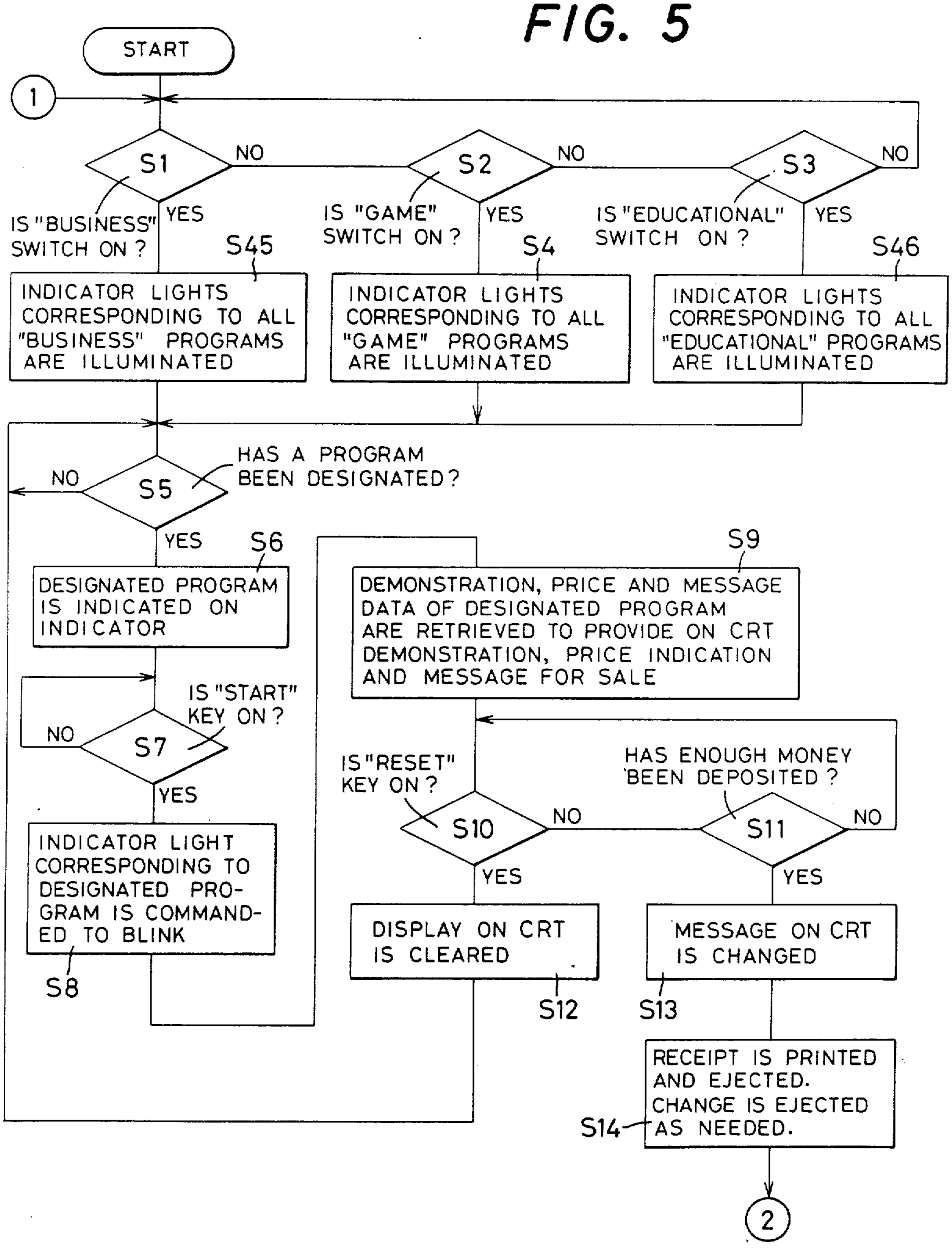
FIGS. 5–9 are schematic block flow charts showing the operations of first and second central processing units of the peripheral vending instrument.

When the purchaser depresses the GAME selector key 14 (S2) to buy a GAME program for a video game, for example, the first CPU 41 operates as shown in FIG. 5. At first, the first CPU 41 activates all of the indicator lights 7 that correspond to all GAME programs (serial numbers 1–20, and some of the new programs, serial numbers 61–68 which are GAME programs), whereby the appropriate Serial No. indicia 6 on the display panel 4 are illuminated to indicate the program representations 5 of the GAME program group (S4).

Then, the purchaser enters, with the Ten-keys 10, a serial number corresponding to a desired one of the GAME programs whose representations 5 are illuminated by the indicator lights 7 on the display panel 4. As soon as the desired GAME program has been designated (S5), the serial number of the GAME program is indicated on the indicator 22 (S6), and the first CPU 41 waits for the activation of the START key 12. In response to an ON signal generated from the START key 12 upon depression thereof (S7), the first CPU 41 causes only the indicator light 7 corresponding to the designated serial number, to blink or flicker (S8). In the meantime, the first CPU 41 reads out from the "DEMONSTRATION DISPLAY" RAM 43 the designated program, its demonstration data and price data, and transfers them to the CRT 8 (S9). The demonstration data represents an abstract of the subject matter of the designated program, more particularly, visual images to provide a brief demonstration of the contents of the program, e.g., abstract views of a video game played by the selected GAME program.

According to the demonstration data, demonstration images are displayed on the CRT 8. Simultaneously, the CRT 8 indicates a selling price of the program according to the price data, and provides a message "Please deposit money if you wish to buy this program." according to the message data (S9). Consequently, the purchaser is able to decide whether to buy the program which has been designated, by observing the demonstration images and the selling price information provided on the CRT 8.

While the demonstration images are viewed on the CRT 8, the first CPU 41 waits for the activation of the RESET key 13 (S10) or the deposit of money (S11). When the purchaser wishes to cancel the designated program, that is, wishes to see demonstration images of another program, the RESET key 13 is depressed. In this instance, the first CPU 41 stops the demonstration on the CRT 8 and the flickering operation of the indicator light 7 corresponding to the program which has been demonstrated on the CRT 8 (S12). Then, the first CPU 41 becomes ready to accept the input of a serial number of another program (S5).

On the other hand, when the purchaser deposits a cash through the paper-money inlet 19 and/or coin slots 20, 21, the first CPU 41 compares the "deposit" data from the counter 48 with the price data read out from the "DEMONSTRATION" RAM 43 (S11). If the sum of the deposited cash is equal to or greater than the predetermined selling price of the designated program, the first CPU 41 changes the preceding message on the CRT 8 to a message "Thank you very much." (S13), and activates the receipt printer 49 to print out a receipt, which is then fed to the receipt exit 23 (S14). In the case where the comparison of the "deposit" data with the price data indicates an overpayment by the purchaser, the appropriate amount of change is supplied to the change tray 27 (S14).

Although the designated program is subsequently duplicated into the tape cassette 25 as described later, the activation of the START key 12 and the deposit of enough amount of money (confirmed by the counter 48) are required conditions for initiating the duplication (sale) of the program which has been designated by the Ten-keys 10. In other words, the central processing means 41, 42 of the instant embodiment checks to see if the START key 12 and the counter 48 have been placed in the predetermined positions, before the designated program is duplicated in the tape cassette 25. The START key 12 and the counter 48 are used as means for checking if the conditions required for vending a program have been satisfied or not. The central processing means 41, 42 serve to inhibit the duplicating device 45 from duplicating the selected program in the tape cassette 25 until the START key 12 and the counter 48 have been placed in their predetermined positions. The activation of the START key 12 means the final selection by the purchaser of the program, and the payment confirmed by the counter 48 indicates the final decision of the purchaser to buy the program.

After the receipt has been printed out by the printer 49, the first CPU 41 sends a command signal to the host CPU 37 through the private line, directing retrieval of the designated program from the magnetic disk memory 40 and transfer of the retrieved program to the "PROGRAM DISPLAY" RAM 44*a* and the "COPY" RAM 44*b*. (S15-FIG. 6). In response to the command signal, the host CPU 37 retrieves the appropriate source program from the disk memory 40 and transfers the same to the first CPU 41 through the private communication line. The first CPU 41 then stores the program temporarily in the "PROGRAM DISPLAY" RAM 44*a* and the "COPY" RAM 44*b*. Subsequently, the first CPU 41 retrieves from the "DEMONSTRATION DISPLAY" RAM 43 the demonstration data corresponding to the program stored in the RAMs 44*a*, 44*b*, and stores the retrieved demonstration data into the "COPY" RAM 44*b* (S15).

In the meantime, the second CPU 42 retrieves the selected program and its demonstration data from the "COPY" RAM 44*b*, and operates the automatic duplicating device 45 to duplicate the retrieved program and the demonstration data in the blank tape cassette 25 (S16). As soon as the duplication of the program has been started, the first CPU 41 energizes the "COPY" light PL1 (S16) to inform the purchaser that the selected program is under duplication.

After the illumination of the "COPY" light PL1, the first CPU 41 retrieves the program from the "PROGRAM DISPLAY" RAM 44*a*, and operates the CRT 8 to execute the program while the program is being duplicated (S17). In this specific example wherein the program is a GAME program, the corresponding video game is played or animated on the screen of the CRT 8. Thus, the purchaser may enjoy and/or confirm the game played on the CRT 8, and therefore does not feel bored, while the program is being copied in the tape cassette 25.

While the program duplication by the duplicating device 45 and the program execution on the CRT 8 are being effected, the second CPU 42 continuously checks if the program duplication has been completed or not (S18), and the first CPU 41 continuously checks if the program execution on the CRT 8 has been completed or not (S22). As long as the program duplication or execution has not been completed, the duplicating device 45 and the CRT 8 continue to operate (S21, S23). Upon completion of the program duplication, the second CPU 42 directs the duplicating device 45 to rewind the recorded tape of the cassette 25, and eject the cassette 25 to the cassette tray 26 (S20). The ejection of the tape cassette 25 is checked by the second CPU 42 (S19).

Figure 7:
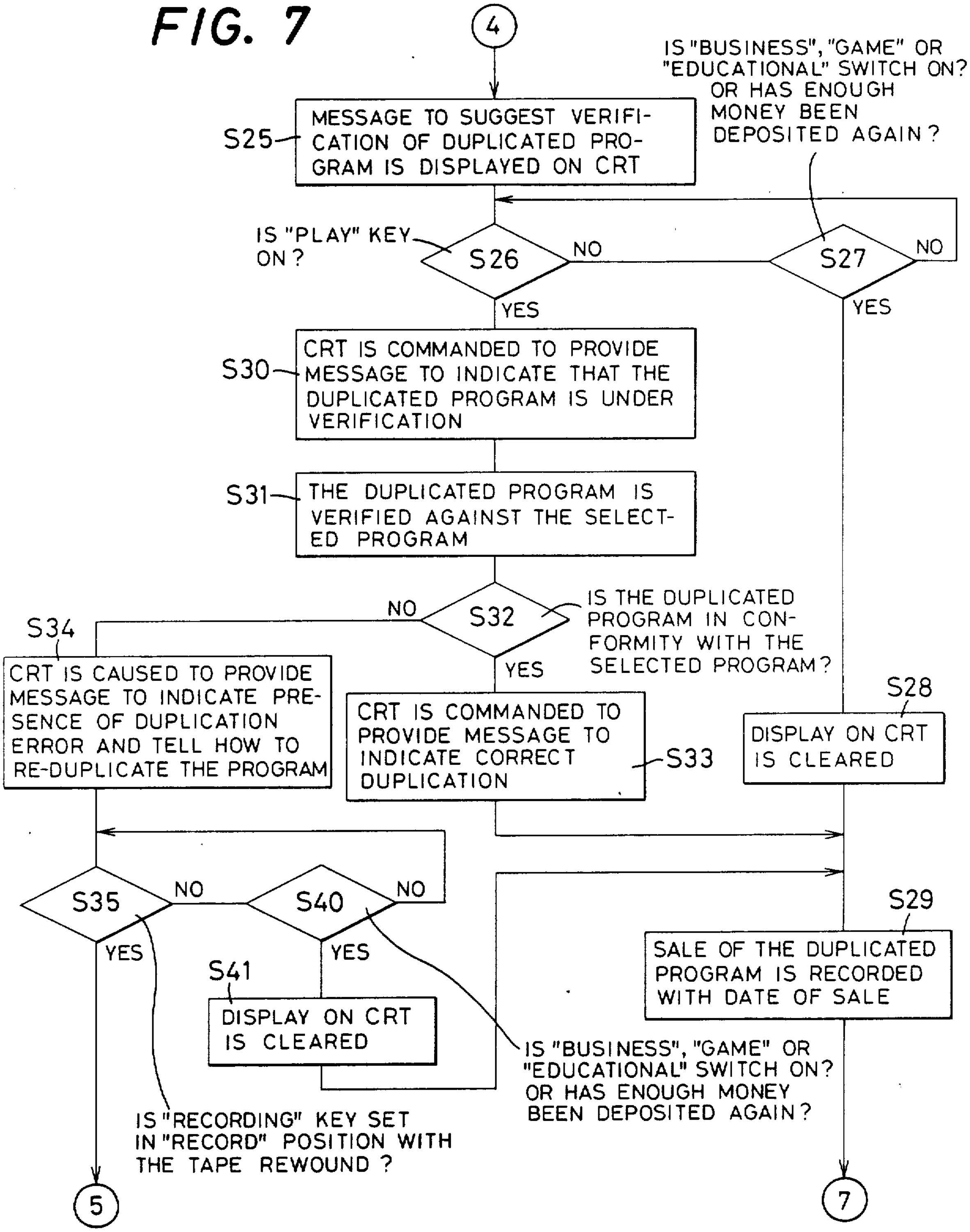
Figure 8:
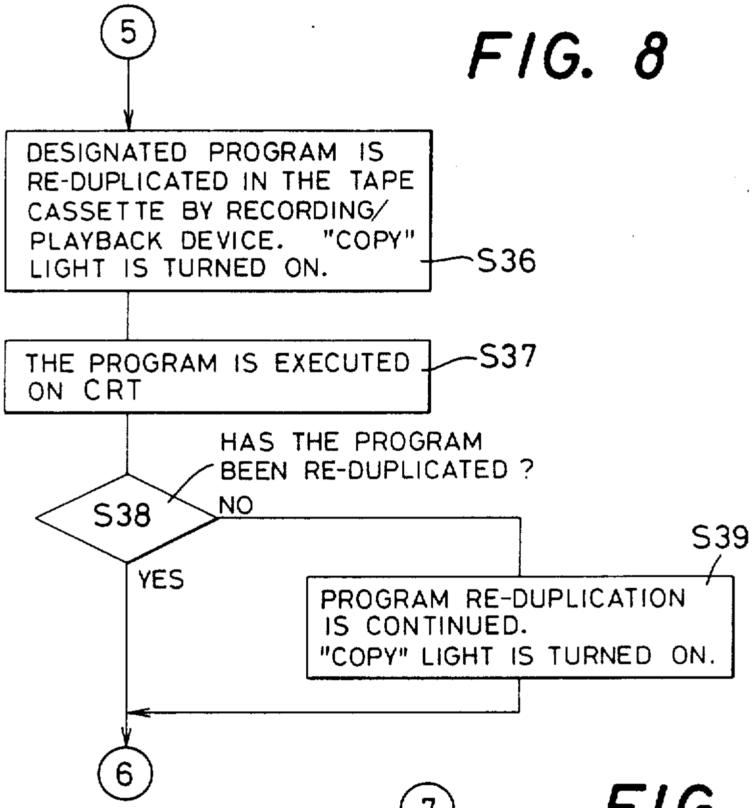

When the recorded tape cassette 25 has been ejected to the cassette tray 26 and the program execution (video game) on the CRT 8 has ended (S24), the first CPU 41 retrieves from the "DEMONSTRATION DISPLAY" RAM 43 message data and transfers the same to the CRT 8 to provide a message "You may verify the recorded tape cassette, if you wish, by using recording/playback device available on the instrument." (S25-FIG. 7). Upon observing this message, the purchaser decides whether to verify the duplicated program in the tape cassette 25 against the source program to check for any duplication errors.

In the case where the purchaser does not wish to verify the duplicate program, the PLAY key KY3 of the recording/playback device 24 is not activated (S26). When any of the GAME, BUSINESS and EDUCATIONAL selector keys 14–16 is depressed by the same purchaser to buy another program, or by another purchaser to buy a desired program (S27), the display on the CRT 8 is cleared (S28) and the first CPU 41 applies a command signal to the host CPU 37 to update the sale record in the magnetic disk memory 40. Described in more detail, the number of sales of the program, which was recorded in the third memory area of the memory 40, is incremented to record the instant sale of the program in response to the command signal from the first CPU 41 (S29).

When the purchaser wishes to verify the duplicate program in the tape cassette 25 ejected to the cassette tray 26, the purchaser sets the ejected tape cassette 25 in the recording/playback device 24 on the control table 1*a* so that the program on the tape may be played back, and depresses the PLAY key KY3 (S26). Upon receipt of an ON signal from the PLAY key KY3, the first CPU 41 retrieves from the "DEMONSTRATION DISPLAY" RAM 43 message data to provide on the CRT 8 a message "The duplicated program is under verification. The verification will be over in a short time." (S30). At the same time, the tape cassette recording/playback device 24 is operated to read the program (and its demonstration data) in the cassette 25, and the program is thus compared with the source program stored in the "COPY" RAM 44*b* (S31).

In the case where the verification reveals that the duplicate program is in conformity with the source program (S32), the first CPU 41 retrieves from the "DEMONSTRATION DISPLAY" RAM 43 message data to provide on the CRT 8 a message "Verification reveals no duplication error." (S33). Then, the control goes to Step S29 for updating the sales record of that program.

If the verification reveals any duplication error, that is, if the duplicate program including the demonstration data is not in conformity with the source program (S32), the first CPU 41 retrieves from the "DEMONSTRATION DISPLAY" RAM 43 message data to provide on the CRT 8 a message "Verification reveals duplication error(s). Rewind the tape cassette and set it for recording." (S34). Then, the first CPU 41 waits for the setting of the tape cassette in its recording position.

Figure 6:
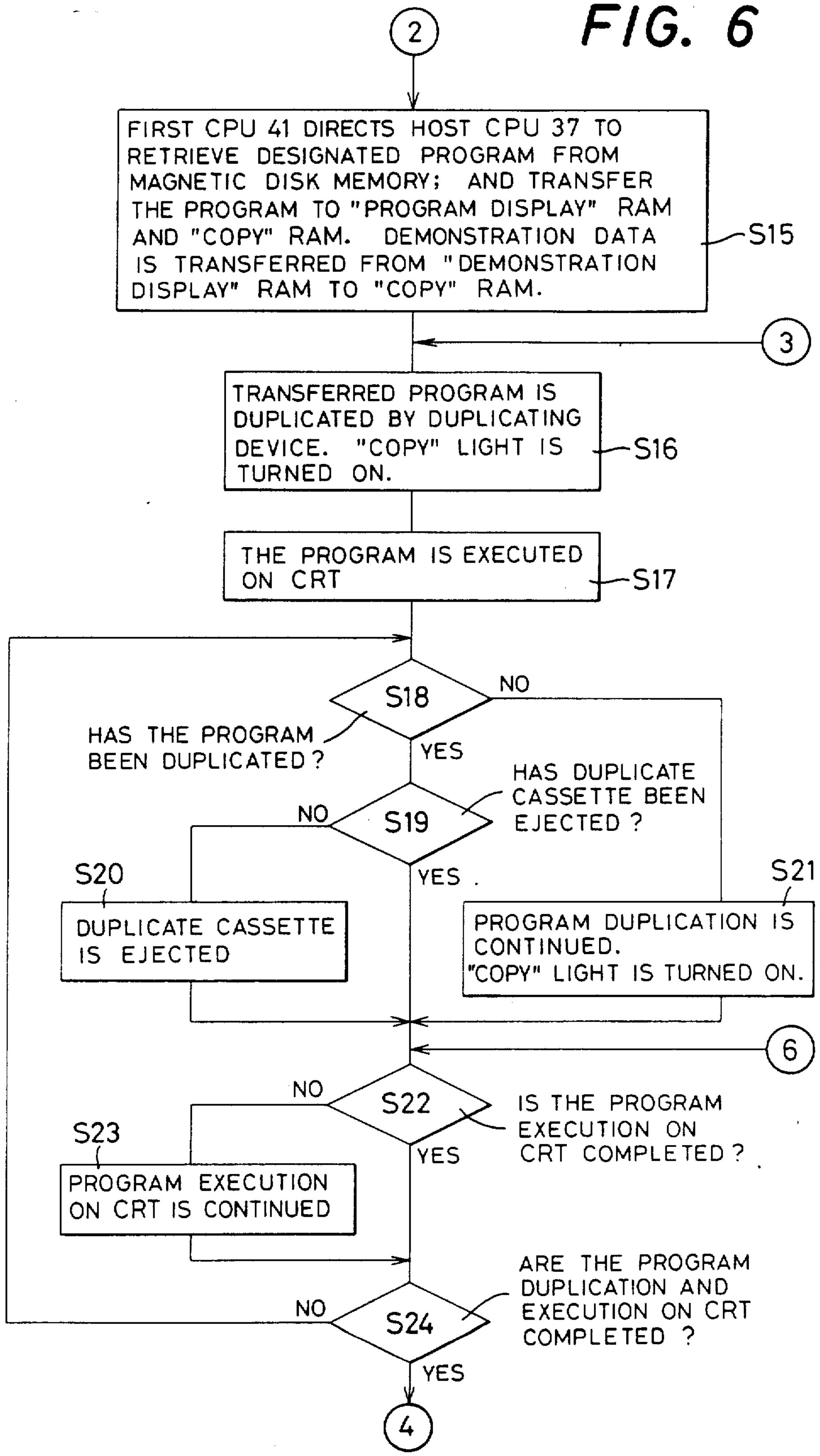

Reading the above message, the purchaser places the tape cassette 25 in the recording/playback device 24, rewinds the tape by operating the REWIND key KY1, and activates the RECORDING key KY5 to start re-duplicating the program in question (S35). In response to an ON signal from the RECORDING key KY5, the first CPU 41 operates the recording/playback device 24 to re-duplicate the program (including its demonstration data) stored in the "COPY" RAM 44*b*, and turns on the "COPY" light PL1 (S36-FIG. 8). At the same time, the program is executed on the CRT 8 (S37) while the same program is being re-duplicated by the recording/playback device 24. The first CPU 41 checks if the re-duplication of the program has been completed or not (S38). The re-duplication is continued with the "COPY" light PL1 kept on until the program has been completely re-duplicated (S39). Upon completion of the program re-duplication by the recording/playback device 24, the control goes to Step S22 (FIG. 6). Thus, the purchaser may obtain the tape cassette 25 which stores the program in conformity with the source program.

In the event the purchaser activates any of the GAME, BUSINESS and EDUCATIONAL keys 14–16 to buy another program, or deposits enough money to buy the same program (S40) without setting the tape cassette 25 for re-duplication by the device 24 (S35), the program re-duplication will not be effected. In this instance, the display on the CRT 8 is cleared (S41) and the control goes to step S29 wherein the sales record in the disk memory 40 of the program in question is updated as previously discussed.

After the sales record of the program has been updated (S29), the first CPU 41 waits for an operation by the purchaser to buy another package of the same program that was duplicated in the ejected tape cassette 25 or to buy a package of another program.

In the case where the same purchaser wishes to buy the same program and deposits money again through the inlet 19 and/or the slots 20, 21 in step S27, the control goes, via S28 and S29, to step S42 (FIG. 9) and the first CPU 41 compares the "deposit" data from the counter 48 with the price data representing the selling price of the program. When the amount of money deposited is equal to or larger than the selling price, (S42), the first CPU 41 causes the CRT 8 to provide a demonstration display of the program, its selling price and a message "Thank you very much." (S43). Simultaneously, the first CPU 41 operates the receipt printer 49 to print a receipt, ejects the printed receipt to the receipt exit 23, and further ejects change to the change tray 27, if necessary (S44). Then, the control goes back to steps S16 and et seq., whereby the program is again duplicated in another tape cassette 25 by the duplicating device 45 (S17) and executed on the CRT 8 during the program duplication (S17). Successively, the previously described steps are repeated.

Figure 9:
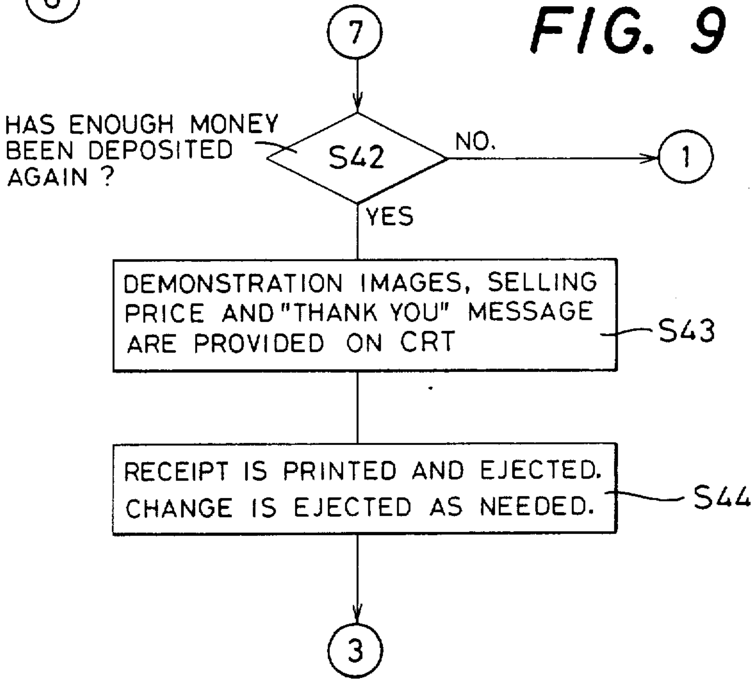

If the same or another purchaser activates the GAME, BUSINESS or EDUCATIONAL selector key 14, 15, 16 in step S27 or S40 to buy another program, the control also goes to step S42 (FIG. 9). In this case, no money has been deposited, and the control goes to the appropriate step S1, S2 or S3.

If the purchaser desires to buy a BUSINESS or EDUCATIONAL program, the BUSINESS or EDUCATION selector key 15 or 16 is depressed (S1, S3; S27, S40). When the BUSINESS selector key 15 is depressed (S1), the indicator lights 7 corresponding to the BUSINESS programs (serial Nos. 21–40 and some of the new programs serial Nos. 61–68 which are BUSINESS programs) are activated to illuminate the appropriate Serial-No. indicia 6 on the display panel 4 (S45).

Similarly, the depression of the EDUCATIONAL selector key 16 (S3) will turn on the indicator lights 7 corresponding to the EDUCATIONAL programs (serial Nos. 41–60 and some of the new EDUCATIONAL programs serial Nos. 61–68) to illuminate the appropriate Serial-No. indicia 6 (S46).

The same procedure as used for buying a GAME program will permit the vending instrument 1 to duplicate a selected BUSINESS or EDUCATIONAL program in the tape cassette 25 (S16) and execute the program on the CRT 8 (S17). Then, the instant sale of the program in question is recorded in the magnetic disk memory 40 of the host system 2, together with the date of sale (S29).

When the software manufacturer, supplier or distributor wishes to know the sales records of the individual programs on sale at the local dealers, the keyboard 30 of the host system 2 is operated to command the host CPU 37 to retrieve the sales data and the price data from the magnetic disk memory 40. The host CPU 37 processes these sales and price data and causes the CRT 29 to display the number of sales and total selling amount of each program sold by the designated vending instrument 1, together with the dates of sales (year, month and day). Simultaneously, the host CPU 37 operates the printer 28 to produce a printout of such sales records.

As described hitherto, when a desired one of different software programs on sale is selected by the Ten-keys 10, its demonstration images and selling price are displayed on the CRT 8, based on the demonstration and price data stored in the "DEMONSTRATION DISPLAY" RAM 43, thereby aiding a purchaser in deciding whether to buy the currently selected program or not.

Upon selection of a desired software program, the source program corresponding to the selected program is transferred from the magnetic disk memory 40 of the host system to the "PROGRAM DISPLAY" RAM 44*a* and "COPY" RAM 44*b* through the exclusive communication line. By depositing an amount of money not less than the selling price indicated on the CRT 8, the program stored in the "COPY" RAM 43 is read out and duplicated in the blank tape cassette 25, which is then supplied to the purchaser. Consequently, the software manufacturer, supplier or distributor does not have to deliver to the local dealers any recorded tape cassettes having duplicate programs, and the local dealer does not have to display such program-loaded tape cassettes on shop stands, i.e., does not have to maintain a stock of these recorded tape cassettes. Thus, the instant software vending system eliminates a conventionally required inventory control of the software goods by the manufacturer, supplier or distributor and by the local dealers.

Further, the foregoing embodiment of the vending system has provisions for enabling the purchaser to verify a duplicate program (in the tape cassette 25) against its source program, and for permiting re-duplication of the same program if the verification reveals any duplication error. Thus, the local dealer may offer the purchaser a program which is exactly identical to its source program.

While the present invention has been described in its preferred embodiment, it is to be understood that the invention is not limited thereto; but may be otherwise embodied.

For example, a tape cassette 25 used as recording medium in the preceding embodiment may be replaced by a floppy disk. Further, it is possible to use a common telephone line, in place of a private or exclusive data communication line used in the previous embodiment, for effecting interactive data communication between the host system 2 and the peripheral vending instruments 1.

Although the foregoing embodiment is designed such that the duplication of a designated program in the tape cassette 25 is initiated when cash in an amount not less than the selling price has been deposited into the instrument 1, it is possible that the program duplication be initiated when a specific switch, for example, the START key 12 has been activated. It is also appreciated that the vending instrument 1 be modified so that a credit card may be used as means for payment.

While in the foregoing embodiment the demonstration data is retrieved from the "DEMONSTRATION DISPLAY" RAM 43 and duplicated in the tape cassette 25 together with the selected program, it is appreciated that the demonstration data, as well as the program, be stored in the magnetic disk memory 40 so that the demonstration data and the program are both transferred to the RAMs 44*a* and 44*b* and duplicated together into the tape cassette 25.

In the foregoing embodiment of the software vending system, the demonstration data, message data and price data are pre-stored in the "DEMONSTRATION DISPLAY" RAM 43, and retrieved therefrom from time to time as required, it is possible that these data be stored in the magnetic disk memory 40 and transferred to the RAM 43 as needed.

What is claimed is:

1. A software vending system comprising:

a host system including primary memory means for storing a plurality of different software programs; and a plurality of peripheral vending instruments each operatively connected to said host system for interactive data communication therebetween;

each of said plurality of peripheral vending instruments including selector means for selecting a desired one of said software programs, secondary memory means for storing the software program which is transferred from said primary memory means and selected by said selector means, recording means operable to duplicate in a recording medium the selected software program which has been stored in said secondary memory means, verifying means for verifying a duplicate program recorded in said recording medium, against said selected program stored in said secondary memory means, and central processing means for inhibiting said recording means from re-duplicating said selected software program in said recording medium when the verification by said verifying means reveals no duplication error, and for permitting said recording means to re-duplicate said selected program in said recorded medium when said verification reveals any duplication error.

2. A software vending system as set forth in claim 1, wherein each said peripheral vending instrument further includes means for checking if a condition required for vending said selected program is satisfied or not, said checking means being placed in a predetermined position when said condition is satisfied, and said central processing means inhibiting said recording means from duplicating said selected program in said recording medium until said checking means has been placed in said predetermined position.

3. A software vending system as set forth in claim 2, wherein said checking means comprises a counter which generates a signal representative of a sum of money deposited into the vending instrument.

4. A software vending system as set forth in claim 1, wherein each said peripheral vending instrument further includes a visual display device, and said secondary memory means is adapted to further store a set of demonstration data corresponding to said selected software program, said set of demonstration data representing an abstract of the contents of said selected software program, said central processing means retrieving from said secondary memory means said set of demonstration data corresponding to said selected software program and operating said visual display device to execute the retrieved set of demonstration data.

5. A software vending system as set forth in claim 4, wherein said secondary memory means stores plural sets of demonstration data corresponding to said plurality of software programs.

6. A software vending system as set forth in claim 4, wherein said at least one set of demonstration data is stored in said primary memory means, and transferred to said secondary memory means when the program is selected.

7. A software vending system as set forth in claim 1, wherein each said peripheral vending instrument further includes a visual display device, said central processing means operating said visual display device to execute said selected program while the selected program is being duplicated by said recording means.

8. A software vending system as set forth in claim 7, wherein said secondary memory means stores plural sets of message data representing messages to a purchaser, said central processing means retrieving from said secondary memory means said message data to provide said messages in response to operation by the purchaser.

9. A software vending system as set forth in claim 8, wherein each of said plural sets of message data is stored in said primary memory means and temporarily stored in said secondary memory means before it is transferred to said visual display device.

10. A software vending system as set forth in claim 1, wherein each said vending instrument further includes an exhibition device comprising program representations showing the contents of said software programs, and serial number indicia disposed adjacent to the respective program representations and numbering said software programs.

11. A software vending system as set forth in claim 10, wherein said selector means comprises numeric keys operable to input numerical values for selecting said desired one of the software programs which are numbered by said serial number indicia.

12. A software vending system as set forth in claim 1, wherein said primary memory means has a memory area for storing said plurality of software programs, and another memory area for storing sales data representing at least the number of duplication of each of said software programs, said sales data being updated when said each software program is duplicated by said recording means.

13. A software vending system as set forth in claim 12, wherein said host system further includes a visual display device for displaying said sales data.

14. A software vending system as set forth in claim 1, wherein each said vending instrument further includes cash-depositing means through which money is deposited, a counter for counting a sum of said money deposited through said cash-depositing means.

15. A software vending system as set forth in claim 14, wherein said secondary memory means stores price data representing a selling price of said selected program, said central processing means comparing the contents of said counter with said price data, said central processing means operating said recording means to duplicate said selected program when said contents of the counter is not smaller than a value of said price data.

16. A software vending system as set forth in claim 15, wherein each said vending instrument further includes a change tray for receiving change when said sum of money counted by said counter is greater than the selling price represented by said price data.

17. A software vending system comprising:

a host system including memory means for storing a plurality of different software programs; and a plurality of peripheral vending instruments each operatively connected to said host system for interactive data communication therebetween, each of said plurality of peripheral vending instruments including selector means for selecting desired one of said software programs, recording means operable to duplicate in a recording medium the software program which is transferred from said memory means and selected by said selector means, verifying means for verifying a duplicate program which has been recorded in said recording medium, against said selected software program transferred from said memory means of the host system, and central processing means for inhibiting said recording means from re-duplicating said selected program in said recording medium if the verification by said verifying means reveals no duplication error, and for permitting said recording means to re-duplicate said selected software program in said recording medium if said verification reveals any duplication error.

18. A software vending system comprising:

a host system including primary memory means for storing a plurality of different software programs; and a plurality of peripheral vending instruments each operatively connected to said host system for interactive data communication therebetween;

each of said plurality of peripheral vending instruments including selector means for selecting a desired one of said software programs, secondary memory means for storing the software program which is transferred from said primary memory means and selected by said selector means, recording means operable to duplicate in a recording medium the selected software program which has been stored in said secondary memory means, a visual display device, central processing means, connected to said secondary memory means, said selector means, said recording means and said visual display device, for operating said visual display device to execute said selected software program while said selected software program is being duplicated by said recording means, and manually-operated means, connected to said central processing means, for interacting with said selected software program while it is executed on said visual display device.

19. A software vending instrument for vending a plurality of different software programs such that a selected one of the different software programs is recorded in a recording medium, said software vending instrument comprising:

memory means for storing said selected software program;

recording means operable to duplicate in said recording medium said selected software program stored in said memory verifying means for verifying a duplicate program recorded in said recording medium, against said selected program stored in said memory means; and central processing means, connected to said memory means, said recording means and said verifying means, for inhibiting said recording means for reduplicating said selected software program in said recording medium when the verification by said verifying means reveals no duplication error, and for permitting said recording means to re-duplicate said selected program in said recording medium when said verification reveals any duplication error.

20. A software vending instrument as set forth in claim 19, further including a visual display device which provides a message to the effect that said duplicate program may be verified to check for duplication error.

21. A software vending instrument as set forth in claim 20, wherein said verifying means comprises a plurality of manually operated switches, including a first one of which is operable to initiate the verification of said duplicate program, said central processing means permitting said verification when said first switch is activated, and disabling said verifying means when any one of the others of said manually operated switches is activated during a period in which said verification is made possible by activation of said first switch.

22. A software vending instrument as set forth in claim 20, wherein when the verification of said duplicate program reveals any duplication error, said visual display device provides a message telling how to reduplicate said selected software program in said recording medium.

23. A software vending instrument as set forth in claim 19, further including a recording/playback device operable to read said duplicate program for verification thereof by said verifying means, said recording/playback device being also operable to reduplicate said selected program in said recording medium, and thereby serving as part of said recording means.

* * * * *